United States Patent Office 3,152,785
Patented Oct. 13, 1964

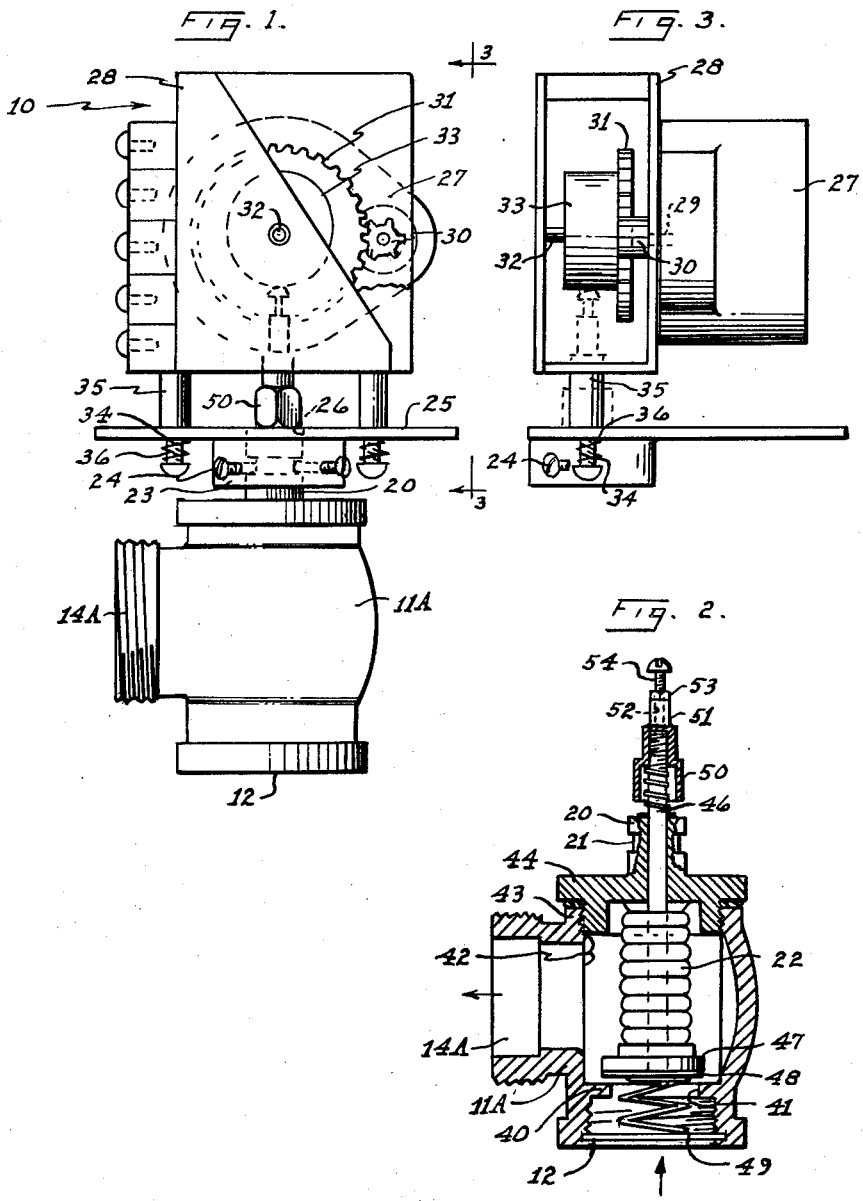

3,152,785
MOTOR OPERATED VALVE ASSEMBLY
Edward J. Zeitlin, Purdy, N.Y., assignor to Heat Timer Corporation, New York, N.Y.
Filed Dec. 12, 1961, Ser. No. 158,833
3 Claims. (Cl. 251—133)

This invention is a continuation in part of my original application Serial No. 749,232, filed July 17, 1958 (now abandoned) for Zone Control for Hot Water or Steam Heating.

This invention relates to a temperature control system for a plurality of zones, each having temperature responsive means for controlling quantity of heating medium furnished to its respective zone. The control system is primarily directed to the control of a hot water or steam heating system.

Ordinarily, with a hot water or steam heating system, the heat is delivered to all parts of the heating system, and of course there may be a great deal more heat delivered to any portion or area than is actually desired. Therefore, in introducing or dividing the heating system into a plurality of zones and controlling the supply of heat to each zone by means of thermostats in each zone, the temperature may be regulated in each zone as desired.

In this invention, the zonal control is primarily a separate installation for the control of that zone and that zone only. Therefore, it is an object of this invention to provide a simple zone valve for any hot water or steam heating system to permit a zone or zones heated by the heating system to be individually controlled, as desired, without controlling the degree of operation of the primary heating element.

A further object of this invention is to provide a simple zone valve in conjunction with a steam or hot water radiator and a thermostat to permit a separate control of each radiator, without affecting the operation of the remainder of the heating system.

A further object of this invention is to provide a motor operated zone valve in combination with each radiation element and a thermostat located in separate zones, in which the zone valve may be opened to permit the flow of heating medium from the primary heating system, in response to a demand for heat in any zone, and in which the zone valve may be closed in response to the thermostatic element, indicating that the demand has been satisfied.

Other objects of this invention may be apparent by reference to the accompanying detailed description and the drawings, in which FIG. 1 is a side elevational view of the zone valve, FIG. 2 is a side elevational view partly in cross section of the valve and operating element, and FIG. 3 is an end view taken on line 3—3 of FIG. 1.

Referring to FIG. 1 there is illustrated a motor operated valve 10 with the controlling mechanism for opening and closing the valve. This valve is used to control the flow of hot water or steam in a heating system as a zone valve or it may be similarly used for the control of the flow of water or any other fluid where it is desired to automatically turn on the flow of water for a predetermined duration of time and again close the valve and stop the flow of water at the end of the cycle that has been selected. The valve proper includes a housing 11A with an inlet port 12 and an outlet port 14A. The housing 11A is provided with a partition 40 in which an aperture 14 is centrally located. Opposite the aperture 41 there is a bore 42 provided, the bore 42 being the internal surface of the valve housing 11A. The end 43 of bore 42 is provided with an internal thread; a nut 44 is threaded into 43. Nut 44 provides an aperture and seal for shaft 46. Integrally formed with nut 44 is a collar 20 through which the shaft 46 also extends. Collar 20 is provided with a circumferential groove 21. Shaft 46 extends into bore 42 and is provided with a bellows 22, the bellows being affixed and sealed to the undersurface of nut 44 at one end and affixed and sealed to a poppet valve 47 at the opposite end. The poppet valve 47 is provided with a poppet face 48 of a suitable material such as plastic, for example, nylon or any tough durable material. The valve face abuts with and closes aperture 41 in the central partition 40 when the valve is closed. The poppet element 47 is thus backed up or supported laterally by the bellows 22 and the shaft 46 is slidable within the bearing support of the nut 44 and collar 40. A spring 49 is positioned between the end of the poppet face 48 and the housing 11A so that the poppet valve 47 is normally retained open by spring 49. Shaft 46 at its opposite end is provided with an external thread and a nut 50 is secured to this threaded end. The nut 50 is provided with an extended portion 51 having an internal threaded bore 52 therein and a locknut 53 positioned at the top of portion 51. An adjustable stud 54 is threadably secured through locknut 53 into the threaded bore 52. Thus the stud 54 may be adjusted to increase or decrease the distance from the poppet valve as required in its operation with a cam 33, FIGS. 1 and 3. Referring to FIG. 1 it is apparent that the collar 20 may be positioned within an external collar 23 and by means of a plurality of equally spaced screws 24, the screws 24 may be turned into the groove 21 to retain the motorized portion of the valve in the position as illustrated in FIG. 1. The motorized portion of the valve 10 comprises the collar 23 with a platform 25 affixed to the upper surface of collar 23. Platform 25 is also provided with an aperture 26 large enough for shaft 46 and nut 50 to protrude therethrough. A motor 27, FIG. 3, is affixed to a supporting cage 28 and the motor shaft 29 extends through cage 28. Shaft 29 is provided with a small spur gear 30. Gear 30 is in turn meshed with a larger gear 31, gear 31 being positioned on a shaft 32 supported between the cage elements 28. Shaft 32 is also provided with a cam 33 and cam 33 is positioned within cage 28 so that the protruding end of shaft 46 on which the adjusting element is secured bears against the surface of cam 33 when the cage 28 is mounted to platform 25. Cage 28 is secured to platform 25 by a plurality of bolts 34. The bolts 34 are provided with spacers 35 to separate cage 28 from the platform 25. Bolts 34 extend through platform 25 and springs 36 are mounted between the end of the bolt 34 and the undersurface of platform 25. Thus with the cage 28 mounted in this manner, there is a degree of yield, that is, the cage 28 need not be adjusted to an exact dimension with regard to the surface of the cam and the poppet valve. If the adjustment is slightly less than required, the cage will lift rather than providing any binding action on the cam. However, normally the springs 36 retain the cage 28, its mechanism and motor 27 in the position as illustrated in FIGS. 1 and 3.

In operation, motor 27 is energized to allow the poppet valve to open as illustrated in FIG. 2, with the cam in the position as illustrated in FIG. 1. The valve allows the circulation of fluid from the inlet port 12 through to the outlet port 14A. Thus when the valve is used as a zone valve, there will be circulation of heating fluid to that particular zone. However, when the thermostat in that particular zone indicates no further demand for heat by means of a circuit, not shown, motor 27 is energized and by means of its geared elements 30 and 31, cam 33 will be rotated approximately 180° to allow the valve to close and the motor 27 will be de-energized by a circuit, not shown. With the rotation of cam 33 approximately 180°, shaft 46 will be forced downward to close valve 48 while the head of the stud 54 rides against the surface of cam 33. With the movement of shaft 46 downward, bellows 22 will be expanded to allow the downward movement of shaft 46 while retaining a definite seal between the valve face and nut 44 so that there is no leakage of fluid from the valve. There are certain features inherent to this valve. The shaft 46 at its upper end is provided with a nut 50 that is easily accessible for any adjustment that may be required without disassembling the valve. The upper end of nut 50 is also provided with adjustment so that in the manufacture, the valves may be assembled and adjusted to a perfect fit with relation to cam 33. A further feature of this valve is the safety mounting of the motor and cam drive so that in the event the adjustment of shaft 46 is too tight, the valve can not be damaged by the operation of the cam nor can the motor be damaged by the stopping of the cam as the spring mounts 34–36 permit the whole assembly to lift and adjust itself to this condition. Also this mounting produces the necessary force for closing and in the event there is any misalignment, this mounting allows the valve a universal movement to thus find a perfect seating. A still further feature of this valve is the easy mounting of the motorized driving portion with relation to the valve proper, that is, by means of the screws 24 the screws may be turned outward so that the ends of the screws are released from groove 21 and the motor assembly may be lifted from shaft 46 thus permitting any repair or adjustment of the motorized portion without affecting the valve proper.

Although valve 10 and its controlling motor 27 have been described in combination with a heating system for the control of the flow of the heating medium, valve 10 may be similarly used to control the flow of any fluid such as a cold water supply to a lawn sprinkler system in which the motor 27 may be controlled or time synchronized in its operation and various changes in the design may be made, that is, to the rotary operational cam for the valve, for example, a direct worm drive to lift or drop the valve may be utilized in the same fashion without departing from the spirit of this invention and the gear reduction means for operating the valve may be changed as long as the valve can be moved to an open or closed position as desired without departing from the spirit of this invention and this invention shall be limited only by the appended claims.

What is claimed is:

1. In a motor operated valve assembly which includes a housing with a valve chamber, an inlet to and an outlet from said valve housing, a valve seat within said housing, a poppet valve mounted in said chamber to align with and mate with said valve seat, a spring mounted between said poppet valve and said inlet to normally retain it open, a poppet valve stem extending from said poppet valve to a point outside of said valve chamber, an enclosing nut for said valve chamber with an aperture through which the valve stem extends, a bellows mounted around said valve stem, said bellows affixed in a sealed relation to said poppet valve at one end and to the under side of said enclosing nut at its opposite end, said enclosing nut provided with a raised portion having a circumferential groove, a supporting cage, a motor, gears and cam assembly, said motor, gears and cam assembly mounted in said supporting cage so that said motor drives said cam in a rotary movement, a platform fixed to said housing, means yieldably supporting said cage on said platform, said platform provided with an aperture at its center, a collar positioned between said platform and said valve and rigidly affixed to the platform to align with said aperture, said collar fitting loosely over the raised portion of said enclosing nut and provided with a plurality of threadably positioned bolts that will align with and fit into said circumferential groove of said raised portion of said enclosing nut, said valve stem extending through said enclosing nut and provided with a threadably secured adjustable extension, said extension adjustable to bear against said cam, said cam shaped to provide a low spot and a high spot 180° apart, said valve remaining open when said valve stem and adjustable extension bears against the low spot on said cam and said valve closing when the adjustable extension bears against the high spot on said cam.

2. In a device according to claim 1 in which the platform supporting the cage, motor, gears and cam assembly can be quickly and easily removed from the valve assembly by releasing said threadably positioned bolts from the circumferential groove of said enclosing nut of said valve assembly.

3. In a device according to claim 1 in which the adjustable extension of said valve stem has means accessible for adjusting said extension.

References Cited in the file of this patent
UNITED STATES PATENTS

| | | |
|---|---|---|
| 1,903,229 | Colman | Mar. 28, 1933 |
| 1,966,675 | Manning | July 17, 1934 |
| 1,989,942 | Parks | Feb. 5, 1935 |
| 2,522,960 | Price | Sept. 19, 1950 |
| 2,574,054 | Miller | Nov. 6, 1951 |
| 2,598,062 | Krecan | May 27, 1952 |
| 3,015,963 | Terry | Jan. 9, 1962 |